(12) United States Patent
Rawlings (10) Patent No.: US 7,690,725 B1
(45) Date of Patent: Apr. 6, 2010

(54) EXTENDABLE RETRACTABLE FURNITURE SAVER COVER

(76) Inventor: Catherine Rawlings, 65 1st Ave., Bayville, NY (US) 11707

( * ) Notice: Subject to any disclaimer, the term of this patent is extended or adjusted under 35 U.S.C. 154(b) by 0 days.

(21) Appl. No.: 12/356,050

(22) Filed: Jan. 19, 2009

(51) Int. Cl.
*A47C 31/10* (2006.01)

(52) U.S. Cl. .................... 297/229; 297/184.11; 297/226

(58) Field of Classification Search ............ 297/184.11, 297/226, 229, 253
See application file for complete search history.

(56) References Cited

U.S. PATENT DOCUMENTS

| | | | | |
|---|---|---|---|---|
| 1,927,331 | A | * | 9/1933 | Wittcoff ...................... 297/229 |
| 2,109,652 | A | * | 3/1938 | Sallop et al. ................. 297/253 |
| 2,172,890 | A | * | 9/1939 | Phillips ........................ 297/226 |
| 2,804,914 | A | * | 9/1957 | Butcko et al. ................ 297/229 |
| 2,842,189 | A | * | 7/1958 | Gratt ........................... 297/227 |
| 4,320,922 | A | * | 3/1982 | Meritis ........................ 297/220 |
| 4,600,238 | A | | 7/1986 | Goodford |
| 4,790,592 | A | * | 12/1988 | Busso et al. ........... 297/184.11 |
| 5,197,411 | A | | 3/1993 | Schwarzenbart |
| 5,537,952 | A | | 7/1996 | Devlin |
| 5,829,828 | A | | 11/1998 | Asfaw |
| 6,158,805 | A | | 12/2000 | Blaney |
| 6,382,720 | B1 | * | 5/2002 | Franklin et al. ........ 297/228.13 |
| 6,412,851 | B1 | | 7/2002 | Burks et al. |
| 6,659,551 | B1 | | 12/2003 | Arenas |
| 7,159,257 | B1 | | 1/2007 | Struthers |
| 2008/0284217 | A1 | * | 11/2008 | Noonan .................. 297/184.11 |

FOREIGN PATENT DOCUMENTS

| | | |
|---|---|---|
| JP | 6197826 | 7/1994 |
| WO | WO2004028853 | 4/2004 |
| WO | WO2005068254 | 7/2005 |
| WO | WO2007051711 | 5/2007 |

* cited by examiner

*Primary Examiner*—Peter R. Brown
(74) *Attorney, Agent, or Firm*—Michael I Kroll (57) ABSTRACT

A protective cover for furniture from pet hair, dander and dirt. The cover is contained within a housing in a rolled state so that it can be easily extended and retracted as desired. Furthermore, the cover has at least one transverse pocket within the body of the cover containing a rigid member that can be tucked between the seat and back rest to keep the cover taut and prevent casual displacement during use. Also provided is a weighted leading edge that will keep the cover taut on the seat and front of the furniture.

10 Claims, 10 Drawing Sheets

EXTENDABLE RETRACTABLE FURNITURE SAVER COVER

BACKGROUND OF THE INVENTION

1. Field of the Invention

The present invention relates generally to furniture covering and, more specifically, to a protective cover for furniture from pet hair, dander and dirt. The cover is contained within a housing in a rolled state so that it can be easily extended and retracted as desired. Furthermore, the cover has at least one transverse pocket within the body of the cover containing a rigid member that can be tucked between the seat and back rest to keep the cover taut and prevent casual displacement during use. Also provided is a weighted leading edge that will keep the cover taut on the seat and front of the furniture.

2. Description of the Prior Art

There are other furniture covers designed for a similar purpose. Typical of these is U.S. Pat. No. 4,600,238 issued to Goodford on Jul. 15, 1986.

Another patent was issued to Schwarzenbart on Mar. 30, 1993 as U.S. Pat. No. 5,197,411. Yet another U.S. Pat. No. 5,537,952 was issued to Devlin on Jul. 23, 1996 and still yet another was issued on Nov. 3, 1998 to Asfaw as U.S. Pat. No. 5,829,828.

Another patent was issued to Blaney on Dec. 12, 2000 as U.S. Pat. No. 6,158,805. Yet another U.S. Pat. No. 6,412,851 was issued to Burks et al. on Jul. 2, 2002. Another was issued to Arenas on Dec. 9, 2003 as U.S. Pat. No. 6,659,551 and still yet another was issued on Jan. 9, 2007 to Struthers as U.S. Pat. No. 7,159,257.

Another patent was issued to Mesaki Hiroyuki on Jul. 19, 1994 as Japan Patent No. JP6197826. Yet another International Patent Application No. WO2004/028853 was published to Arenas on Apr. 8, 2004. Another was published to Brodskiy on Jul. 28, 2005 as International Patent Application No. WO2005/068254 and still yet another was published on May 10, 2007 to Beach as International Patent Application No. WO2007/051711.

U.S. Pat. No. 4,600,238

Inventor: Thomas Goodford

Issued: Jul. 15, 1986

Seat covering designed to protect both the bottom seat cushion and the back seat cushion of the seat of an automotive vehicle. The protective covering comprises a bottom panel for covering the bottom seat cushion and a back panel for covering the back seat cushion. The panels are connected to a take-up reel mounted at the rear edge portion of the seat. The panels are withdrawn from the reel between the rear edge portion of the bottom seat cushion and the back seat cushion to positions of use respectively covering the bottom and back seat cushions.

U.S. Pat. No. 5,197,411

Inventor: Cheryl Schwarzenbart

Issued: Mar. 30, 1993

A pet bed which is flexible and compliant to any surface of furniture or flooring and protects the same from damage by the pet. The pet bed includes a bed body which has a continuous edge, and a roll with a relatively uniform cross section, which extends around a major portion of the edge to enclose a major portion of the bed body. Both the bed body and roll include a batting or padding material which has a drape similar to that of a sleeping bag or bed comforter. The roll has a greater cross section than the bed body, thus, providing a head rest or the like for the pet.

U.S. Pat. No. 5,537,952

Inventor: Joseph Devlin

Issued: Jul. 23, 1996

An improved pet sheet bed cover is provided for a bed having bedding on a mattress sitting on a box spring, which consists of a component for protecting the bedding from being soiled by a pet, such as from hairs, urine, feces, vomit and other animal debris. The protecting component is a bed covering fabricated out of waterproof and soil proof flexible material.

U.S. Pat. No. 5,829,828

Inventor: Aklog Asfaw

Issued: Nov. 3, 1998

A retractable seat cover mounted in a rigid housing with a retractable seat cover sheet rollably releasable and rollably retractable to enable the seat cover sheet to extend over a seat cushion with the rigid housing including an exterior cushion engaging surface so that when the housing is wedgedly inserted between the junction of backrest cushion and a seat cushion the resiliency of the backrest cushion and the seat cushion cause the cushions to hold the retractable seat cover in a usable but substantially concealed condition.

U.S. Pat. No. 6,158,805

Inventor: Bruce Blaney

Issued: Dec. 12, 2000

Apparatus for more conveniently covering and uncovering the individual seats of a two-seat motorized golf cart includes an elongate housing mounted above the seat backs. A pair of rollers are rotatably mounted within the housing by torsion springs. Each roller has a water and weather resistant rectangular sheet wound on it with a rigid bar at the free end. To cover a seat and seat back, the bar is pulled out from the front face slot of the housing and attached to a fastener below the front of the seat. The sheet then covers the seat and seat back in a sloping orientation because the springs maintain constant tension. The sloping orientation enables the cover to shed dirt, debris, water and snow more effectively. When the bar is unfastened, the cover is automatically retracted into the housing.

U.S. Pat. No. 6,412,851

Inventor: Jay Burks et al.

Issued: Jul. 2, 2002

A retractable cover for protecting small vehicles from the weather elements which substantially covers the top and side surfaces of the vehicle. The cover is affixed to a winding mechanism and is encased in a housing when in a fully retracted position. The housing is attached to the exterior of the vehicle with brackets. In the extended position, the cover overlays the top and sides of the vehicle and is secured in place with retention members to the exterior of the vehicle.

U.S. Pat. No. 6,659,551

Inventor: George Arenas

Issued: Dec. 9, 2003

A retractable seat cover for providing temporary protection to a seat, such as an automotive seat or piece of furniture, includes a housing, a roll of fabric, a retraction mechanism, and a strap. The housing may have a slit for enabling the fabric to be extended from or retracted into the housing through the slit, or may have a support arm and end brackets for supporting the fabric therebetween. The fabric, which may be waterproof, moisture repellent, have anti-bacterial properties, have anti-slip properties, or combinations thereof for providing additional protection to the seat, is used to cover the upholstery of the seat. The retraction mechanism includes a spring roller mechanism for controlling rotation of the roll of fabric. The strap is coupled to a top portion of the fabric and is used to secure the seat cover to the seat.

U.S. Pat. No. 7,159,257

Inventor: Lilyn Struthers

Issued: Jan. 9, 2007

A disposable pet hair-collector pad comprising a planar pliable sheet having a layer incorporating a formulation to attract and capture pet hair, dander, saliva, etc., and a backing layer of a fluid impermeable material.

Japan Patent Number JP6197826

Inventor: Mesaki Hiroyuki

Issued: Jul. 19, 1994

PURPOSE: To provide a take-up type waterproof seat cover which is designed to be quickly put over and removed from a seat when driving an automobile while wearing wet clothes such as a swimsuit or a wet suit. CONSTITUTION: A cylindrical main body is made of plastics and has a roller therein for taking up a waterproof cover which is taken up by turning a handle 1 connected to the roller. To put the waterproof cover on a seat, the cover is directly pulled out. This device is fastened to the reverse side of the upper back of the seat by means of a belt 2.

International Patent Application Number WO2004/028853

Inventor: George Arenas

Published: Apr. 8, 2004

A retractable seat cover for providing temporary protection to a seat, such as an automotive seat or piece of furniture, includes a housing, a roll of fabric, a retraction mechanism, and a strap. The housing may have a slit for enabling the fabric to be extended from or retracted into the housing through the slit, or may have a support arm and end brackets for supporting the fabric therebetween. The fabric, which may be waterproof, moisture repellent, have anti-bacterial properties, have anti-slip properties, or combinations thereof for providing additional protection to the seat, is used to cover the upholstery of the seat. The retraction mechanism includes a spring roller mechanism for controlling rotation of the roll of fabric. The strap is coupled to a top portion of the fabric and is used to secure the seat cover to the seat.

International Patent Application Number WO2005/068254

Inventor: Leonid Brodskiy

Published: Jul. 28, 2005

The vehicle cover of the invention consists of three pivotally interconnected cassettes with rolls of a flexible protective cover material stored in each of the cassettes and unwoundable therefrom through a slit in the side of the cassette, similar to a photo film that can be pulled out from a film cassette. In a folded state the cassettes are arranged side by side parallel to each other. Each cassette consists of two parallel sections with the flexible material in each section wound in mutually opposite directions so that the protective flexible materials of each section can be pulled out in mutually opposite directions. The first and the third cassettes are pivotally connected to the second, i.e., the intermediate cassette so that they can be turned by 90 DEG with respect to the intermediate cassette. The ends of the flexible materials may be provided with hooks or other means for securing the materials to the vehicle body in a retracted position. Device can be provided with a guide frame attachable to the luggage rack on the vehicle's roof.

International Patent Application Number WO2007/051711

Inventor: Graham Beach

Published: May 10, 2007

A vehicle has at least one seat whose backrest, at least, is movable between selectable seating positions. The vehicle also has a load space cover arrangement to shield any contents of the vehicle load space from external view. A load space cover for the vehicle comprises a housing from which a retractable and rearwardly-extensible cover section may extend, which housing is movable with the backrest of the seat to avoid a gap appearing between the housing and the seat when the seat is moved.

While these furniture coverings may be suitable for the purposes for which they were designed, they would not be as suitable for the purposes of the present invention, as hereinafter described.

SUMMARY OF THE PRESENT INVENTION

A primary object of the present invention is to provide a protective cover for furniture from pet hair, dander and dirt.

Another object of the present invention is to provide furniture cover that provides a cover contained within a housing in a rolled state so that it can be easily extended and retracted as desired.

Yet another object of the present invention is to provide the cover having at least one transverse pocket within the body of the cover containing a rigid member that can be tucked between the seat and back rest to keep the cover taut and prevent casual displacement during use Still yet another object of the present invention is to provide a weighted leading edge that will keep the cover taut on the seat and front of the furniture.

Additional objects of the present invention will appear as the description proceeds.

The present invention overcomes the shortcomings of the prior art by providing a protective cover for furniture from pet hair, dander and dirt. The cover is contained within a housing in a rolled state so that it can be easily extended and retracted as desired. Furthermore, the cover has at least one transverse pocket within the body of the cover containing a rigid member that can be tucked between the seat and back rest to keep the cover taut and prevent casual displacement during use. Also provided is a weighted leading edge that will keep the cover taut on the seat and front of the furniture.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Apparatus for Protecting Furniture of the present invention. With regard to the reference numerals used, the following numbering is used throughout the various drawing figures.

10 apparatus for protecting furniture of the present invention
12 cover
14 housing
16 weighted leading edge
18 pocket
20 rigid member
22 actuator
24 user
26 furniture
28 cat
30 dog
32 canvas
34 push button retractor
36 extension pull tab
38 spring pulley cam
40 seat of 26
42 backrest of 26
44 bed

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
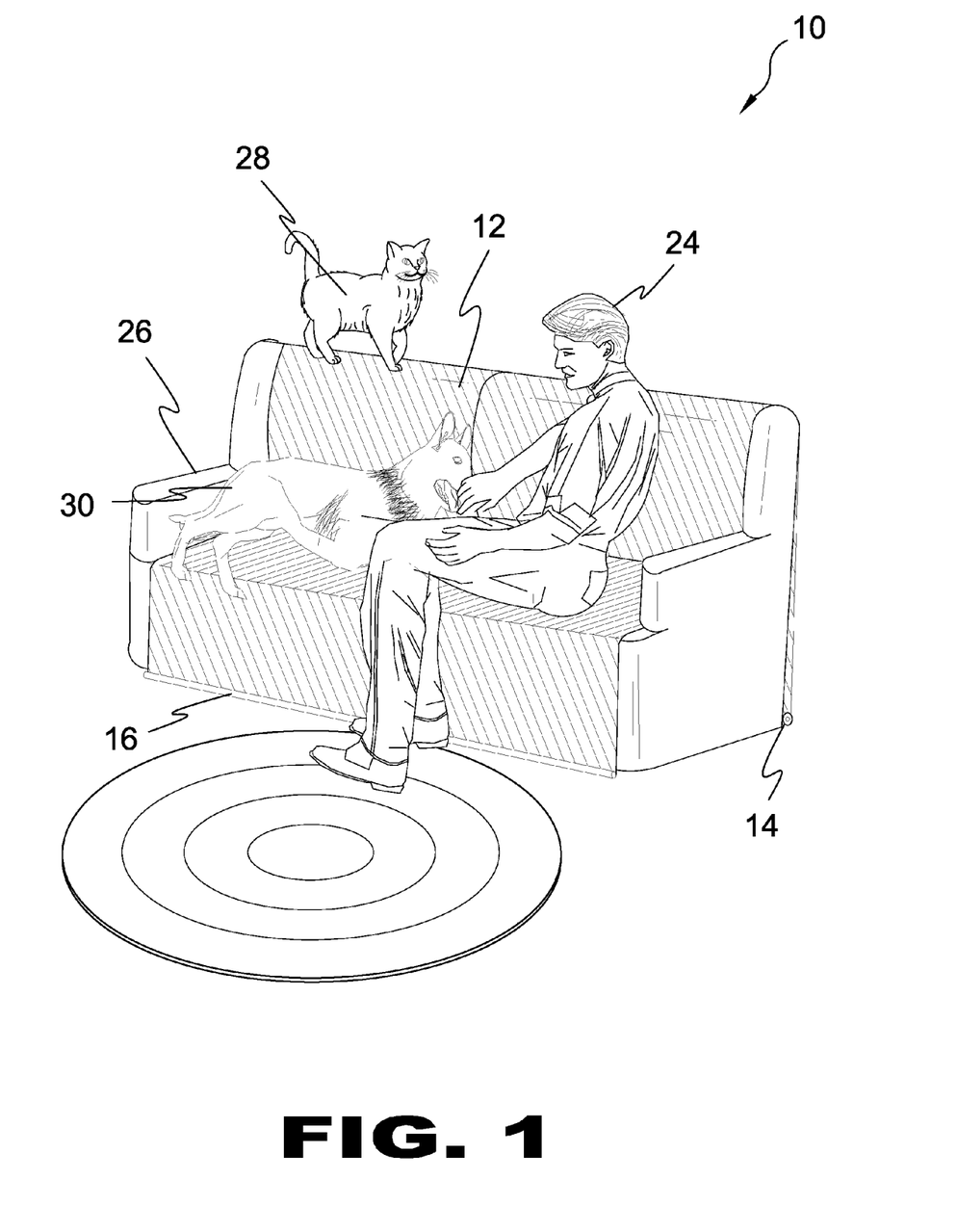
FIG. 1 is an illustrative view of the present invention in use.

FIG. 1 is an illustrative view of the present invention 10 in use. The present invention is a protective cover apparatus 10 for furniture from pet hair, dander and dirt. The cover apparatus has a flexible sheet 12 is contained within a housing 14 in a rolled state so that it can be easily extended and retracted as desired. Furthermore, the cover has at least one transverse pocket within the body of the cover containing a rigid member that can be tucked between the seat and back rest to keep the cover taut and prevent casual displacement during use. Also provided is a weighted leading edge 16 that will keep the cover taut on the seat and front of the furniture. Shown is the user 24 on a protected couch 26 with a cat 28 and a dog 30.

Figure 2:
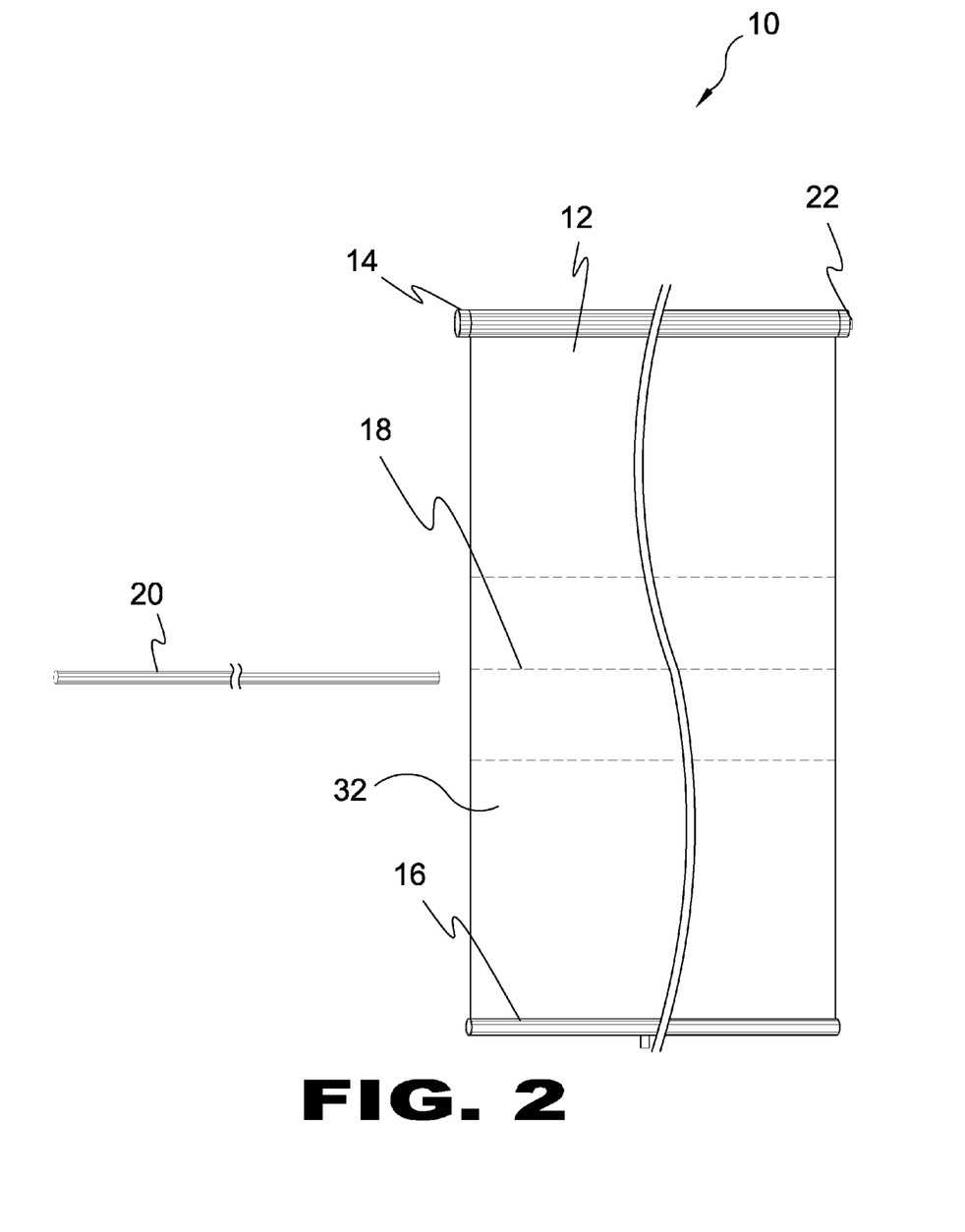
FIG. 2 is a top view of the furniture protector of the present invention.

FIG. 2 is a top view of the furniture protector of the present invention. Shown is a top view of the furniture saver cover 10 extended. The furniture saver cover is similar to a roll-up shade that would drape over furniture from the floor in the back to the floor in the front, having a weighted leading edge 16 and the weight of the housing 14 at the rear edge to hold it in place and a centrally disposed transverse pocket 18 that would enable another rigid member 20 to be inserted and once inserted tucked into the space at the back of the cushions to hold it in place. An actuator 22 is associated with the housing 14 to retract the cover back into the housing when desired. The cover material can be made of canvas 32 to prevent pet hair from clinging to the cover and therefore easily cleaned.

Figure 3:
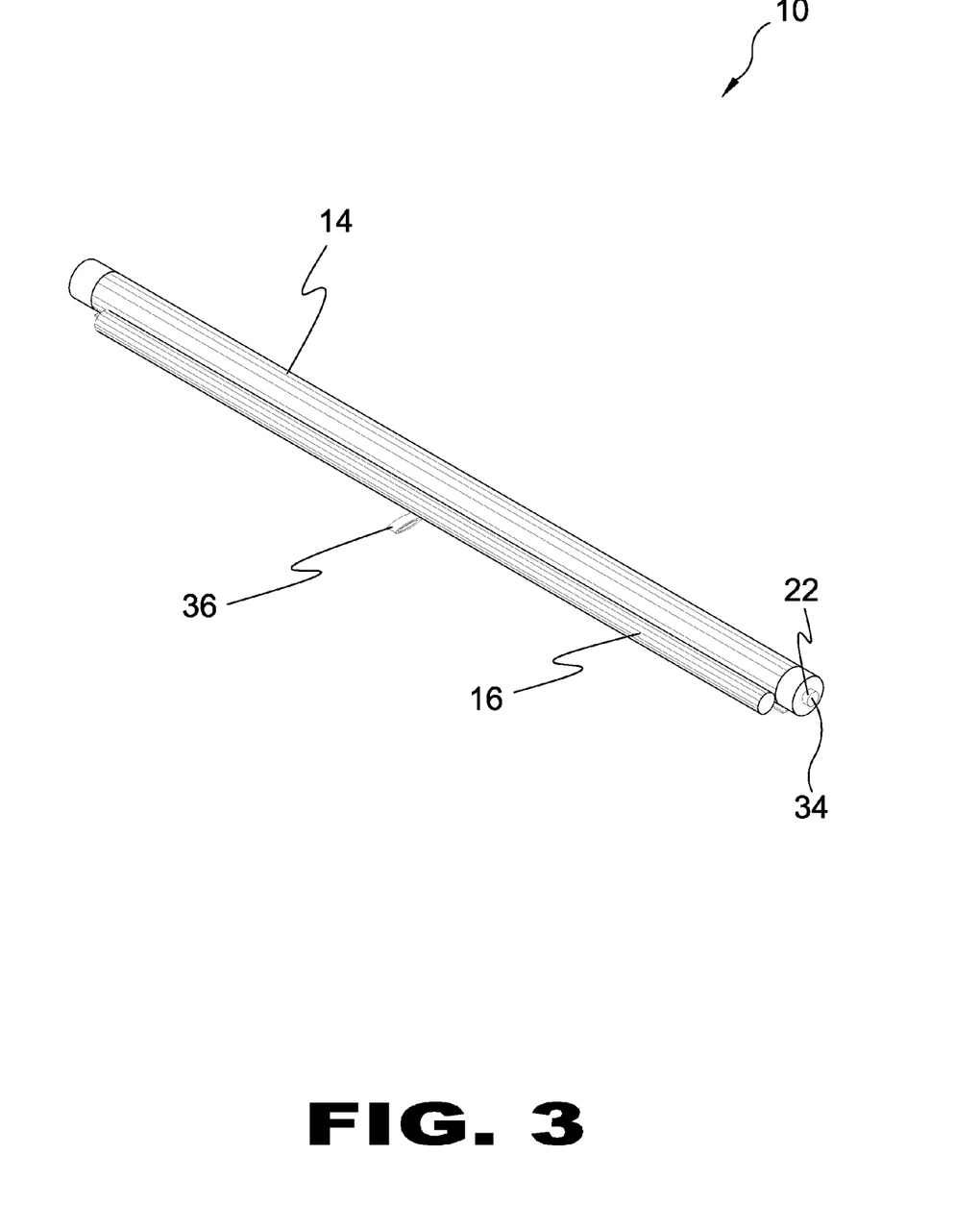
FIG. 3 is a perspective view of the present invention in a retracted position.

FIG. 3 is a perspective view of the present invention 10 in a retracted position. Shown is the present invention 10 in a retracted position having a housing 14 containing a rolled cover that is selectively extendible and retractable covering the rear side, back rest and seat portion with a weighted edge 16 for keeping the cover taut when extended. The cover has a stay comprising an appropriately located pocket for receiving a rigid member positionable in the recess between the back rest and seat preventing displacement of the cover when extended. The housing optionally incorporates a base plate positionable under the rear furniture legs anchoring the cover housing in a desired location. Shown is the actuator 22 depicted as a push button retractor 34 and an optional extension pull-tab 36.

Figure 4:
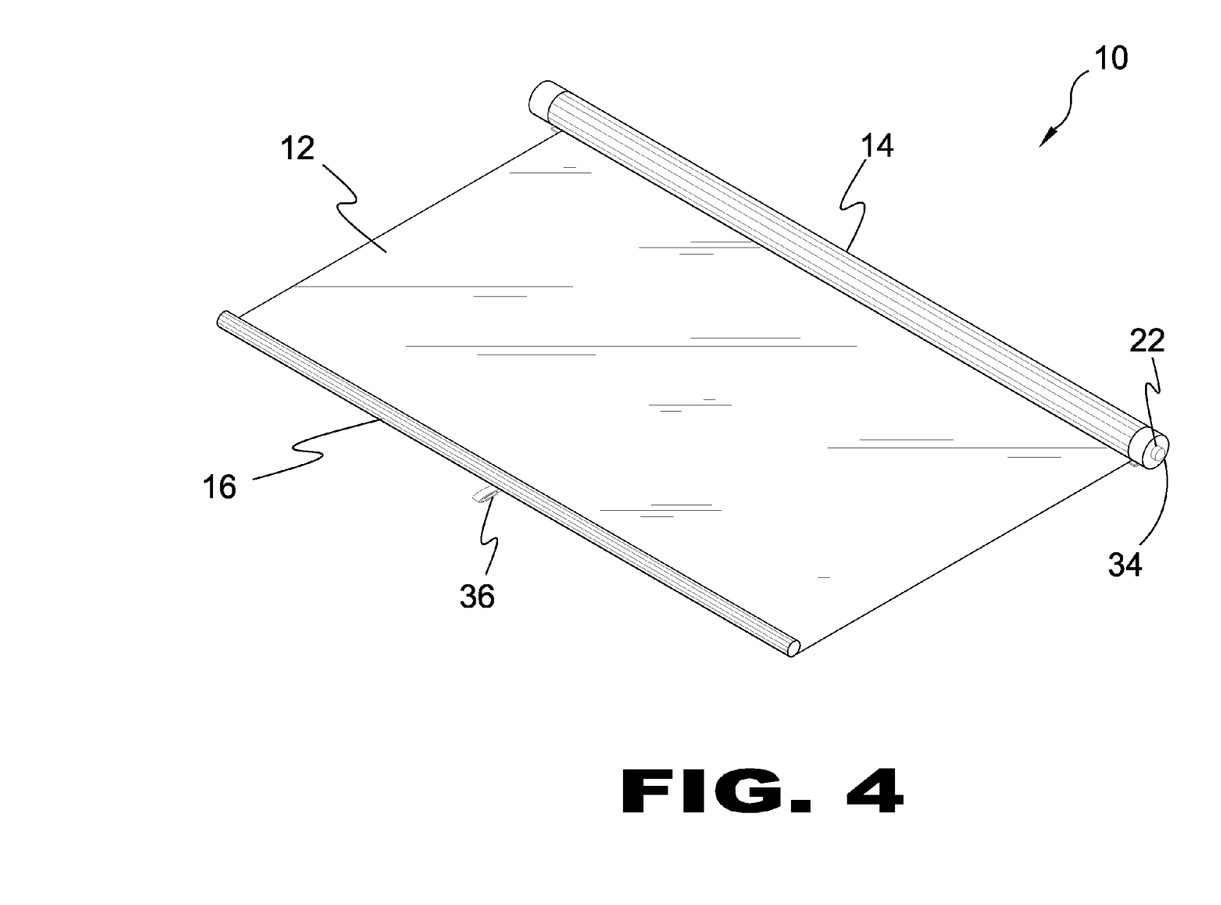
FIG. 4 is a perspective view of the present invention in a partially extended position.

FIG. 4 is a perspective view of the present invention 10 in a partially extended position. Shown is the present invention in a partially extended position having a housing 14 containing a rolled cover 12 that is selectively extendible and retractable covering the rear side, back rest and seat portion with a weighted end 16 for keeping the cover taut when extended. The cover has a stay comprising an appropriately located pocket for receiving a rigid member positionable in the recess between the back rest and seat preventing displacement of the cover when extended. The housing optionally incorporating a base plate positionable under the rear furniture legs anchoring the cover housing in a desired location. Shown is the actuator 22 depicted as a push button retractor 34 and an optional extension pull-tab 36.

Figure 5:
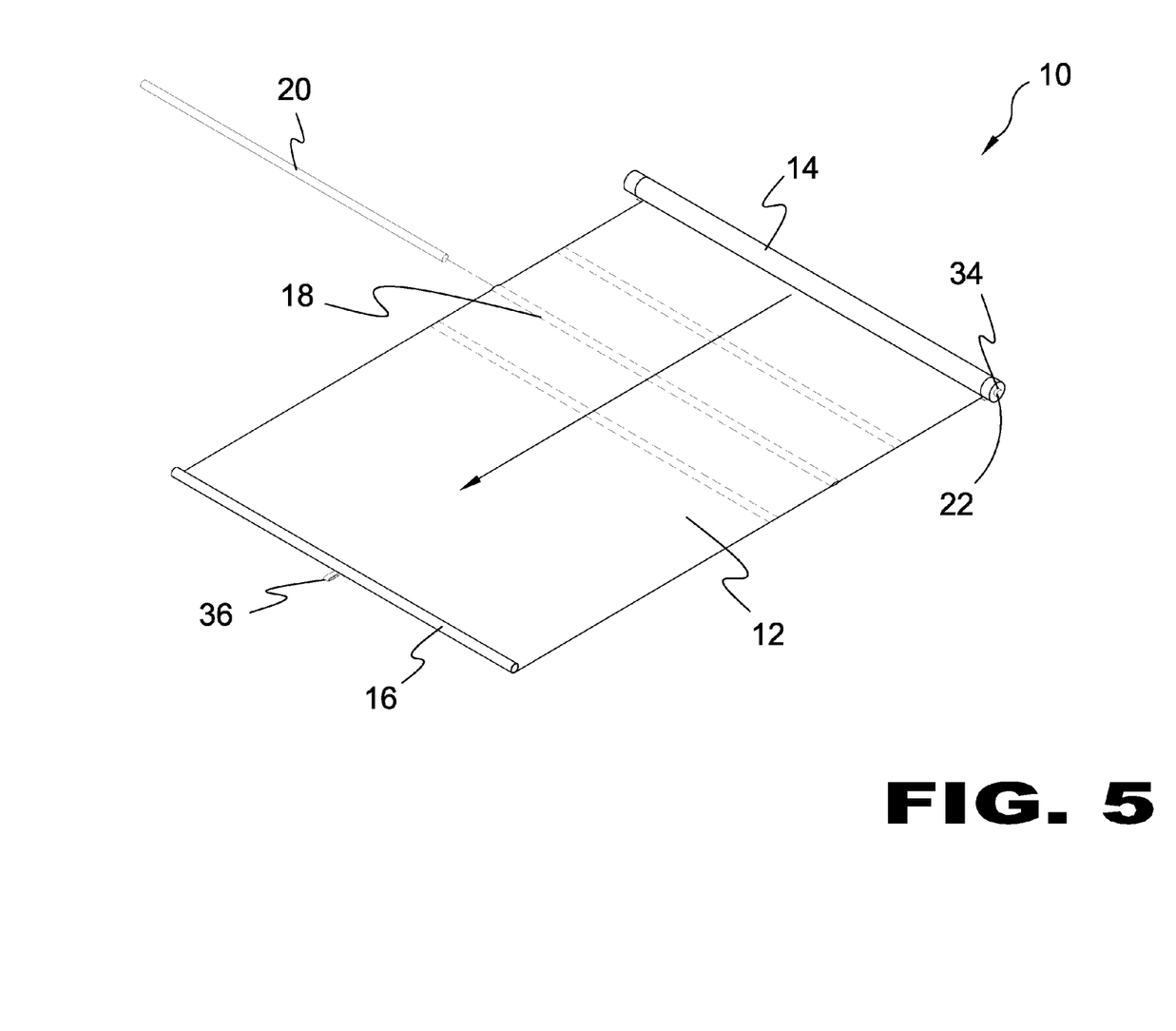
FIG. 5 is a perspective view of the present invention in an extended position.

FIG. 5 is a perspective view of the present invention 10 in an extended position. Shown is the present invention in an extended position having a housing 14 containing a rolled cover 12 that is selectively extendible and retractable covering the rear side, back rest and seat portion having a weighted end for keeping the cover taut when extended. The cover has a stay comprising an appropriately located pocket 18 for receiving a rigid member 20 positionable in the recess between the back rest and seat preventing displacement of the cover when extended. Also shown is the actuator 22 depicted as a push button retractor 34 and an optional extension pull-tab 36.

Figure 6:
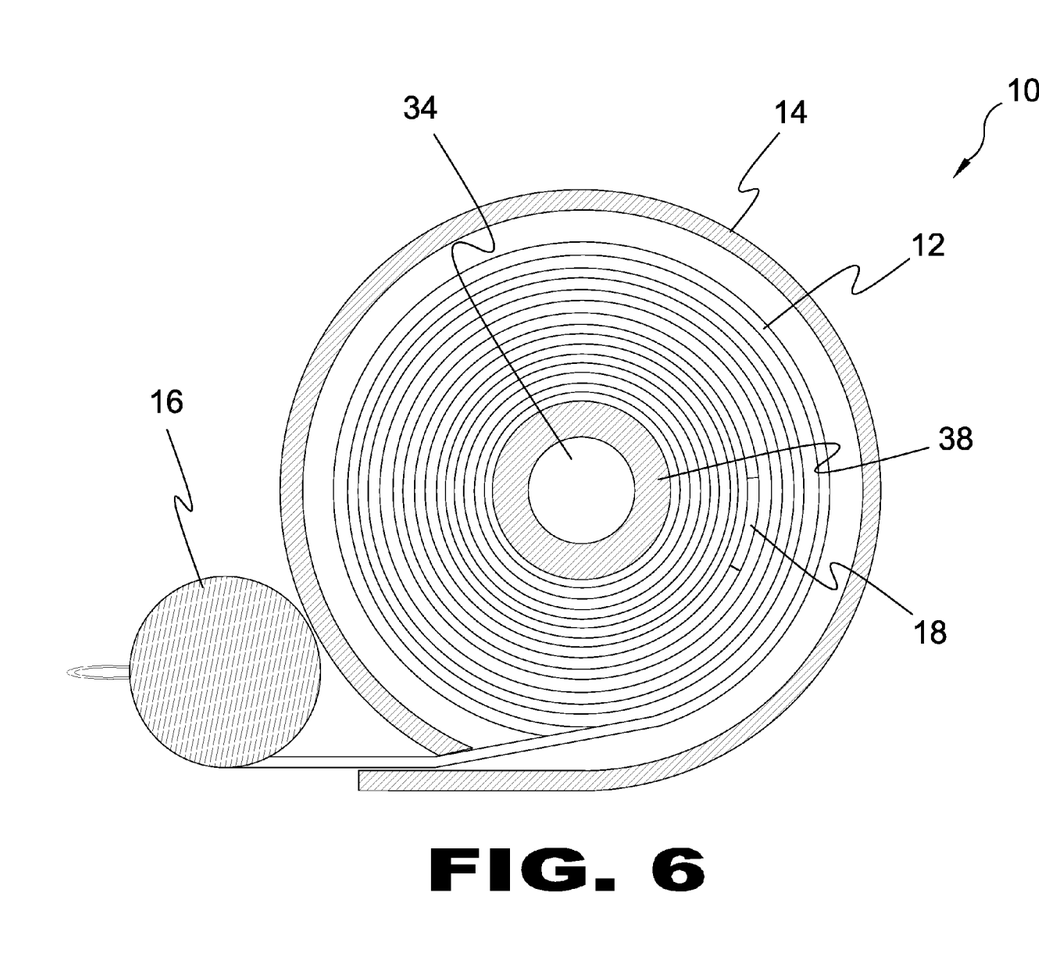
FIG. 6 is a sectional view of the present invention in a retracted position.

FIG. 6 is a sectional view of the present invention 10 in a retracted position. Shown is a sectional view of the present invention 10 in a retracted position having a housing 14 containing a rolled cover 12 that is selectively extendible and retractable covering the rear side, back rest and seat portion with a weighted end 16 for keeping the cover 12 taut when extended. The cover 12 has a stay comprising an appropriately located pocket 18 for receiving a rigid member positionable in the recess between the back rest and seat preventing displacement of the cover when extended. A spring pulley cam 38 serves to retract the cover 12 when the push button retractor 34 is depressed.

Figure 7:
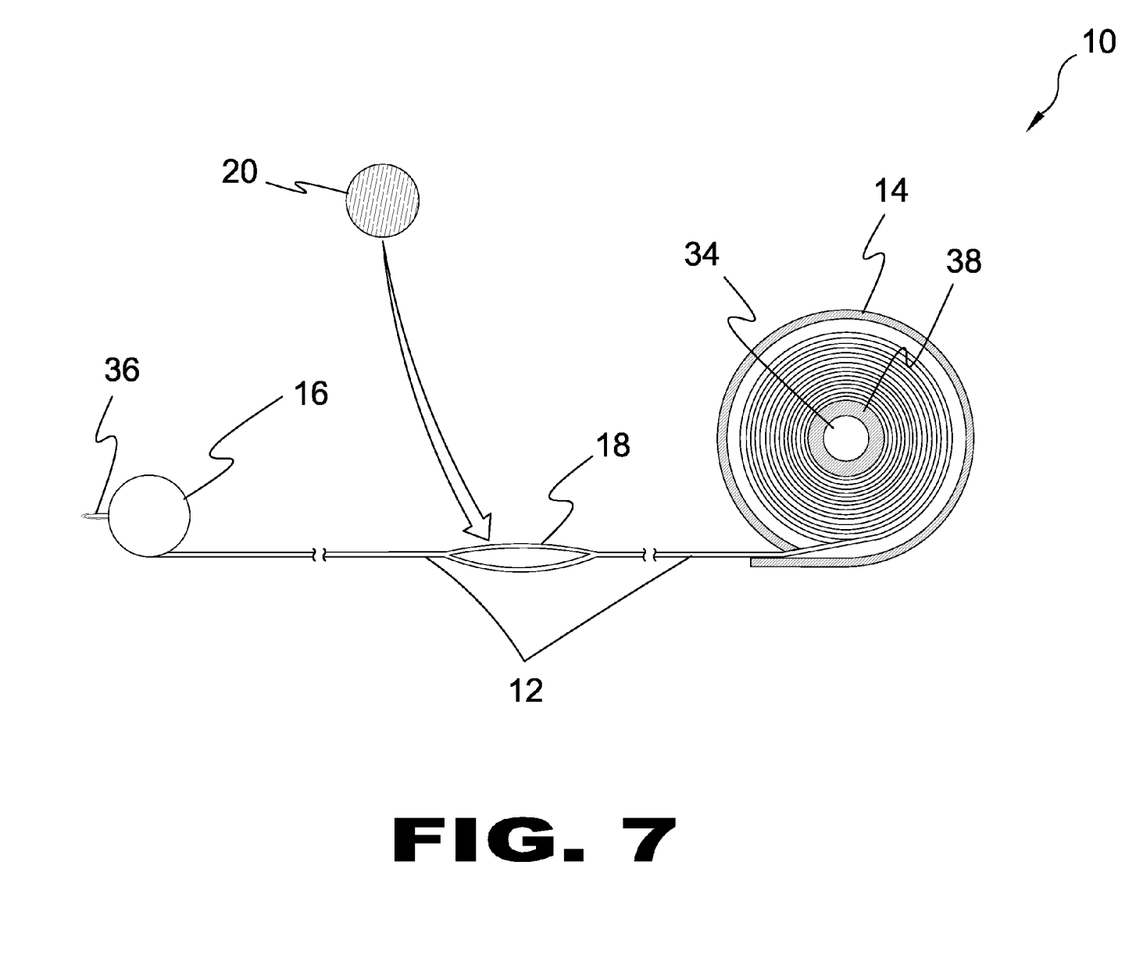
FIG. 7 is a sectional view of the present invention in an extended position.

FIG. 7 is a sectional view of the present invention 10 in an extended position. Shown is a sectional view of the present invention in an extended position having a housing 14 containing a rolled cover 12 that is selectively extendible by pulling the extension pull tab 36 and retractable by pushing the push button retractor 34 to release the spring pulley cam 38. The device is used for covering the rear side, back rest and seat portion of a furniture piece and has a weighted leading edge 16 and the weight of the housing 14 on the rear edge for keeping the cover 12 taut when extended. The cover 12 has a stay comprising an appropriately located pocket 18 for receiving a rigid member 20 positionable in the recess between the back rest and seat preventing displacement of the cover 12 when extended.

Figure 8:
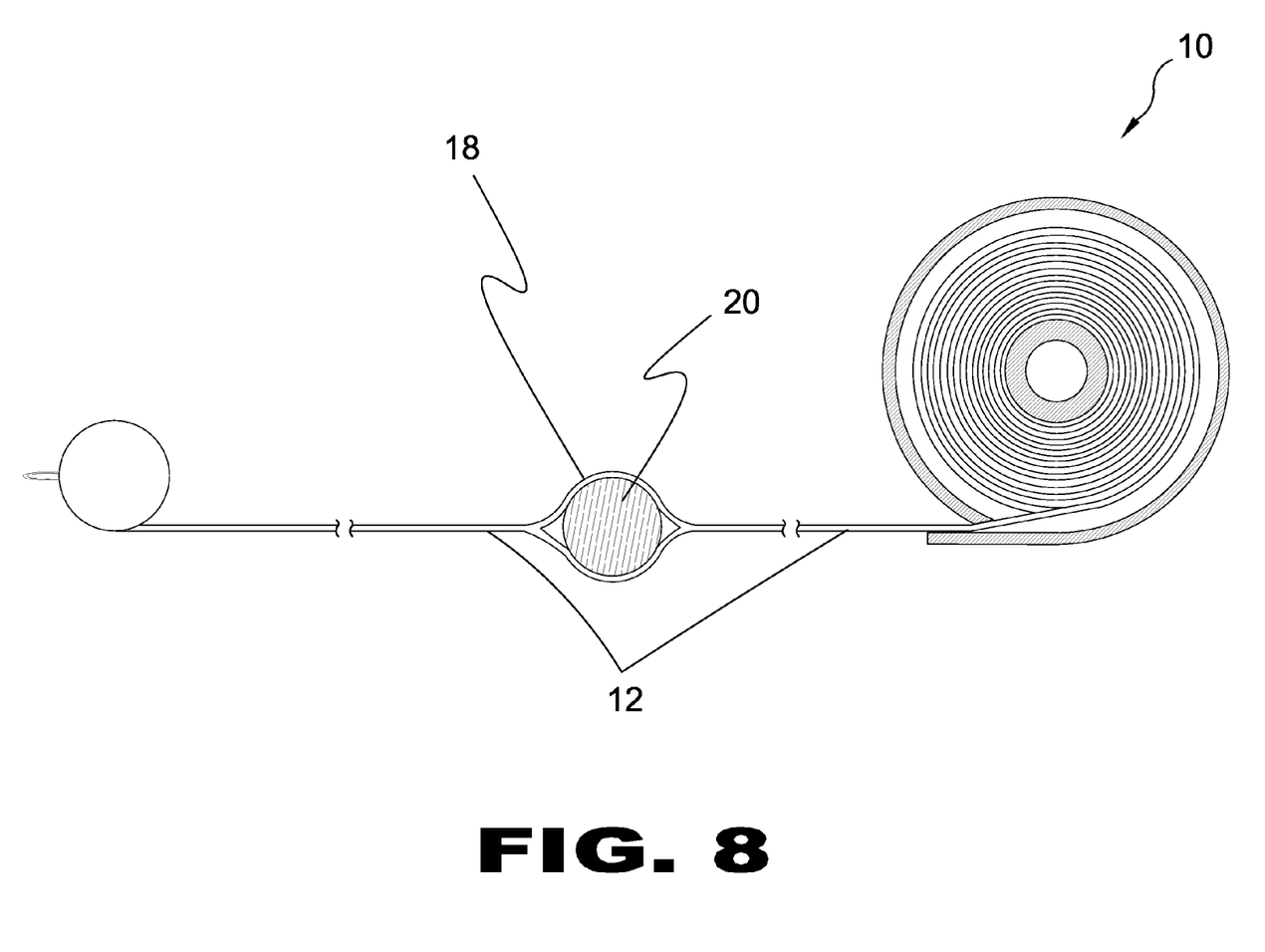
FIG. 8 is a sectional view of the present invention in an extended position with back rest/seat rigid member within pocket.

FIG. 8 is a sectional view of the present invention 10 in an extended position with back rest/seat rigid member 20 within pocket 18. The cover 12 has a stay comprising an appropriately located pocket 18 for receiving a rigid member 20 positionable in the recess between the back rest and seat preventing displacement of the cover 12 when extended.

Figure 9:
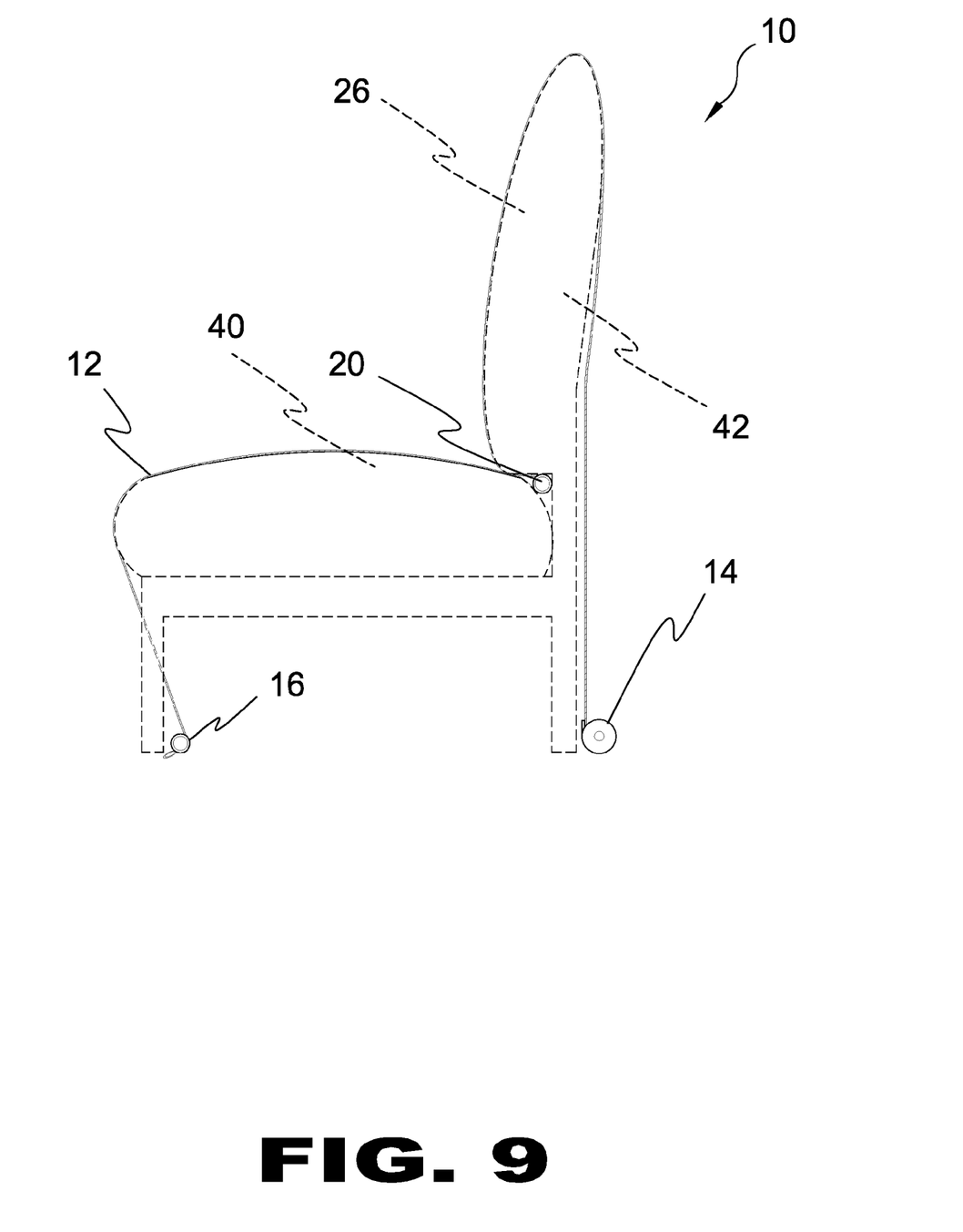
FIG. 9 is a side view of the present invention in use.

FIG. 9 is a side view of the present invention 10 in use. Shown is a side view of the present invention 10 in use on a piece of furniture 26. The rigid member 20 is tucked between the seat 40 and the backrest 42 and the cover is pulled taut by the weight lead edge 16 in front and the weight of the housing 14 behind.

Figure 10:
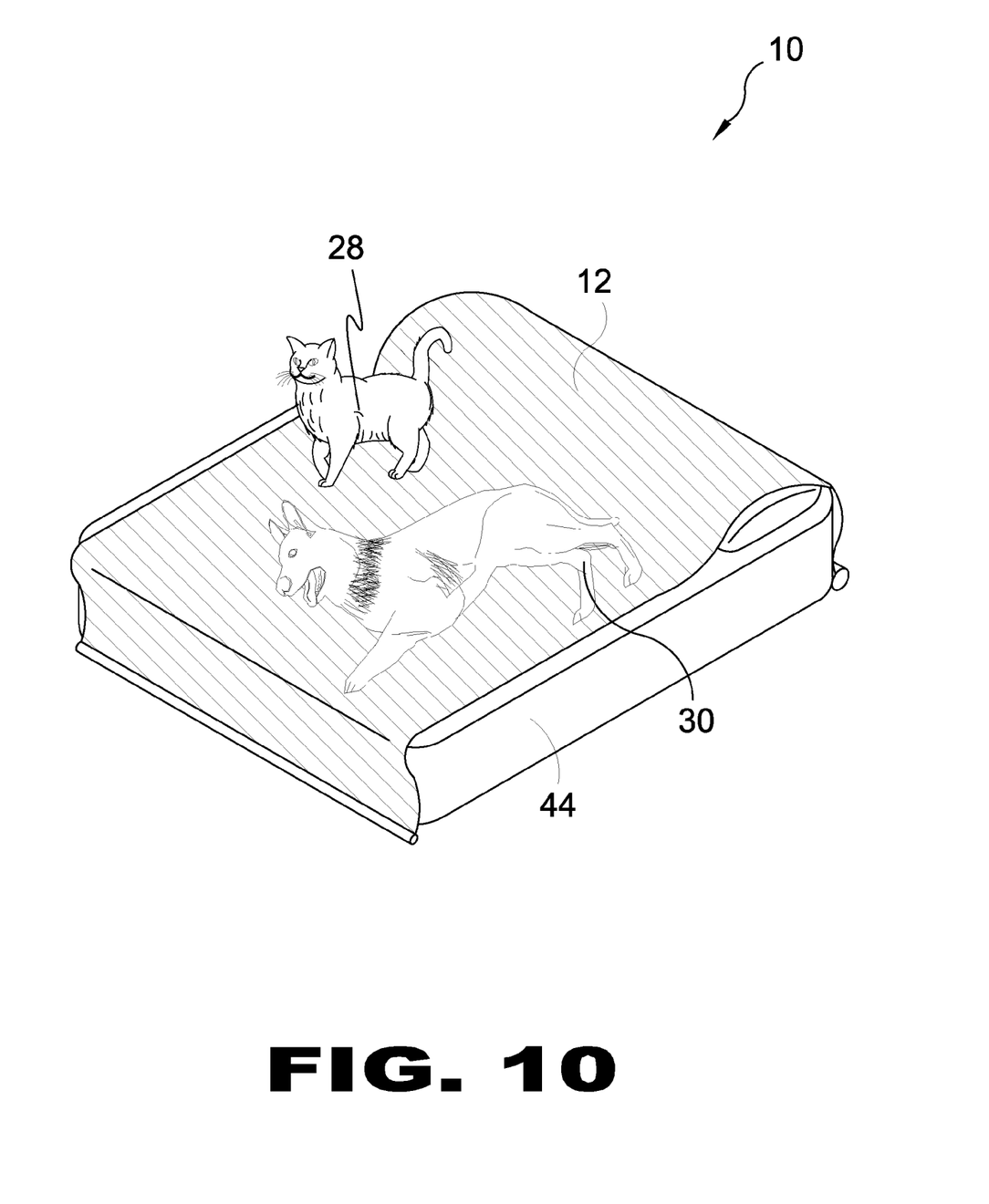
FIG. 10 is an illustrative view of the present invention in use.

FIG. 10 is an illustrative view of the present invention 10 in use on a bed 44 with a dog 30 and a cat 28 on it. Shown is the present invention used as a protective cover for a bed 44 from pet hair, dander and dirt. The cover 12 is contained within a housing in a rolled state so that it can be easily extended and retracted as desired.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for providing an extendable/retractable cover to protect an article of home furniture comprising:
   a) a flexible sheet having a leading edge and a rear edge to serve as a cover for said furniture;
   b) a housing unattached to said furniture to which said rear edge is secured therein, whereby said housing may be moved from one piece of furniture to another piece of furniture without removing any attachments;
   c) a weight member disposed along said leading edge;
   d) a retractor within said housing for selectively retracting said cover into said housing when not in use;
   e) a pocket in said flexible sheet located between said leading and rear edges to receive a rigid member when said flexible sheet is pulled out of said housing for use, said pocket containing said rigid member being adapted to be tucked into a recess between a seat cushion and back of said furniture to prevent displacement of said cover when deployed on said furniture;
   f) said housing being weighted to retain said housing on a floor behind the back of said furniture;
   g) the leading edge of said sheet being weighted to allow said leading edge to remain on a floor below a front edge of said cushion: and
   h) said rigid member being removable from said recess to allow said sheet to be retracted into said housing for storage or for use on another piece of furniture.

2. The apparatus for providing an extendable/retractable cover to protect furniture according to claim 1, wherein said retractor is a spring pulley cam.

3. The apparatus for providing an extendable/retractable cover to protect furniture according to claim 2, wherein said recess is at least one transverse pocket disposed in said cover which collapses when said rigid member is removed.

4. The apparatus for providing an extendable/retractable cover to protect furniture according to claim 3, wherein said rigid member is inserted and removed from a side of said sheet.

5. The apparatus for providing an extendable/retractable cover to protect furniture according to claim 4, wherein said weighted leading edge and said housing on said rear edge provide opposing bias from said rigid member to maintain said cover tautly against the seat and the backrest of the furniture article.

6. The apparatus for providing an extendable/retractable cover to protect furniture according to claim 5, wherein said cover is fabricated of a canvas material.

7. The apparatus for providing an extendable/retractable cover to protect furniture according to claim 6, wherein said weighted leading edge further includes an extension pull tab for extending said cover from said housing.

8. The combination of an article of home furniture and a removable extendable/retractable cover to protect said article of home furniture from pet hair, dander and dirt comprising:
   a) a flexible sheet cover having a leading end and a rear end;
   b) a housing affiliated with said rear end;
   c) a weighted member attached to said leading end so that said leading edge will remain in place on a floor in front of said article of furniture;
   d) a retractor in said housing for retracting said cover into said housing;
   e) a transversely displaced pocket in said cover and a rigid member sized to slide therein for securing a mid portion of said cover between the seat and the backrest of said article of home furniture;
   f) said housing and cover not being attached to said article of furniture when deployed and readily movable to any other article of furniture;
   g) said housing being weighted to allow said housing to remain in place on said floor behind a back of said furniture.

9. The combination according to claim 8, wherein said retractor is a spring pulley cam.

10. The combination according to claim 8, wherein said rigid member is slidable into said pocket when the cover is extended and subsequently placed between the seat and the backrest of said furniture article with the weighted leading edge in the front and the rear end behind the furniture article to provide a taut, non-displaceable cover thereon.

* * * * *